United States Patent
Rumsby et al.

(10) Patent No.: US 11,659,427 B2
(45) Date of Patent: May 23, 2023

(54) EFFICIENT REAL-TIME 802.11AX OFDMA STATISTICS LOGGING

(71) Applicant: Spirent Communications, Inc., San Jose, CA (US)

(72) Inventors: Steven R. Rumsby, Colts Neck, NJ (US); Fengbin Dong, Beijing (CN); Liang Jin, Manalapan Township, NJ (US)

(73) Assignee: Spirent Communications, Inc., San Jose, CA (US)

( * ) Notice: Subject to any disclaimer, the term of this patent is extended or adjusted under 35 U.S.C. 154(b) by 111 days.

(21) Appl. No.: 17/239,473

(22) Filed: Apr. 23, 2021

(65) Prior Publication Data

US 2021/0337413 A1 Oct. 28, 2021

Related U.S. Application Data

(60) Provisional application No. 63/026,692, filed on May 18, 2020.

(51) Int. Cl.
*H04W 24/10* (2009.01)
*H04W 72/04* (2023.01)
*H04L 5/00* (2006.01)

(52) U.S. Cl.
CPC .......... *H04W 24/10* (2013.01); *H04L 5/0007* (2013.01); *H04W 72/0426* (2013.01); *H04W 72/0493* (2013.01)

(58) Field of Classification Search
CPC ..... H04W 24/04; H04W 24/10; H04W 4/023; H04W 4/029; H04W 4/16; H04W 4/90; H04W 64/003; H04W 72/0426; H04W 72/0493; H04W 72/10
See application file for complete search history.

(56) References Cited

U.S. PATENT DOCUMENTS

| 9,474,054 B1 * | 10/2016 | Pawar .............. H04W 72/0413 |
| 10,075,862 B2 * | 9/2018 | Scahill ................. H04W 28/04 |
| 10,602,388 B1 * | 3/2020 | Rengarajan ......... H04L 43/0852 |

(Continued)

OTHER PUBLICATIONS

IEEE P802.11ax/D8.0, 802.11 Working Group of the LAN/MAN Standards Committee, IEEE Computer Society. Oct. 2020, 820 pgs.

*Primary Examiner* — Dung B Huynh
(74) *Attorney, Agent, or Firm* — Haynes Beffel & Wolfeld, LLP; Ernest J. Beffel, Jr.

(57) ABSTRACT

The disclosed technology addresses the problem of testing performance of RU scheduling algorithms used by an OFDMA enabled AP to support multiple clients, using a two-armed test harness with a wired connection to one side of an AP under test and multiple wireless clients coupled in RF communication with the AP. The wireless clients can be connected over the air or conductively to antenna(s) of the AP under test. The test harness generates test traffic. A sniffer radio listens to RU allocation and schedules traffic broadcast by the AP to multiple clients. A recording module records the RU allocation and traffic and a report generator categorizes the recorded resource allocation with the scheduling traffic heard by the sniffer radio and provides resource allocation statistics. The wireless clients are connected conductively or OTA to antennas of the AP under test. One sniffer radio replaces multiple sniffers used in prior test systems.

20 Claims, 10 Drawing Sheets

(56) References Cited

U.S. PATENT DOCUMENTS

| | | | |
|---|---|---|---|
| 10,735,894 B2* | 8/2020 | Ayoub | H04W 4/38 |
| 10,922,069 B2* | 2/2021 | Grill | G06Q 30/0283 |
| 11,258,679 B2* | 2/2022 | Grinkemeyer | H04L 43/0835 |
| 2002/0076030 A1* | 6/2002 | Statham | H04M 3/53325 |
| | | | 379/112.06 |
| 2005/0068922 A1* | 3/2005 | Jalali | H04L 41/0896 |
| | | | 370/335 |
| 2006/0136591 A1* | 6/2006 | Klotsche | H04L 45/00 |
| | | | 709/226 |
| 2007/0002736 A1* | 1/2007 | Gade | H04W 12/126 |
| | | | 726/23 |
| 2008/0152031 A1* | 6/2008 | Lee | H04W 72/0413 |
| | | | 375/260 |
| 2009/0042579 A1* | 2/2009 | Kitajima | H04L 5/0023 |
| | | | 455/446 |
| 2009/0092126 A1* | 4/2009 | Flynn | H04L 63/02 |
| | | | 370/352 |
| 2010/0093363 A1* | 4/2010 | Malladi | H04W 52/343 |
| | | | 455/452.2 |
| 2010/0311435 A1* | 12/2010 | Mueck | H04W 48/20 |
| | | | 455/453 |
| 2011/0207489 A1* | 8/2011 | DeLuca | H04W 72/1205 |
| | | | 455/509 |
| 2012/0030358 A1* | 2/2012 | MacKenzie | H04W 52/0229 |
| | | | 709/226 |
| 2012/0039185 A1* | 2/2012 | Chen | H04W 12/03 |
| | | | 370/329 |
| 2012/0054661 A1* | 3/2012 | Rados | H04L 67/75 |
| | | | 709/224 |
| 2012/0231761 A1* | 9/2012 | Norhammar | H04L 43/062 |
| | | | 455/405 |
| 2012/0331478 A1* | 12/2012 | Zhu | H04W 72/0486 |
| | | | 718/104 |
| 2013/0176871 A1* | 7/2013 | Bertze | H04W 24/08 |
| | | | 370/252 |
| 2013/0298170 A1* | 11/2013 | ElArabawy | H04L 47/2416 |
| | | | 725/62 |
| 2013/0308549 A1* | 11/2013 | Madan | H04W 28/26 |
| | | | 370/329 |
| 2013/0339105 A1* | 12/2013 | Russell | G06Q 10/0639 |
| | | | 705/7.42 |
| 2014/0036703 A1* | 2/2014 | Ding | H04W 48/04 |
| | | | 370/252 |
| 2014/0146700 A1* | 5/2014 | Fonseca Dos Santos | H04W 16/14 |
| | | | 370/252 |
| 2014/0274077 A1* | 9/2014 | Raman | H04W 16/18 |
| | | | 455/446 |
| 2014/0313908 A1* | 10/2014 | da Silva | H04W 72/042 |
| | | | 370/252 |
| 2015/0163242 A1* | 6/2015 | Laidlaw | H04L 63/1466 |
| | | | 726/22 |
| 2015/0215902 A1* | 7/2015 | Suga | H04W 72/04 |
| | | | 455/450 |
| 2015/0351076 A1* | 12/2015 | Pais | H04L 5/0007 |
| | | | 370/312 |
| 2016/0073391 A1* | 3/2016 | Awad | H04L 1/0003 |
| | | | 370/329 |
| 2016/0081003 A1* | 3/2016 | Ishihara | H04B 7/15507 |
| | | | 370/338 |
| 2016/0119914 A1* | 4/2016 | Oizumi | H04W 16/14 |
| | | | 370/329 |
| 2016/0262149 A1* | 9/2016 | Futaki | H04W 52/367 |
| 2017/0048722 A1* | 2/2017 | Van Phan | H04W 16/16 |
| 2017/0150509 A1* | 5/2017 | Halabian | H04W 72/0493 |
| 2017/0193501 A1* | 7/2017 | Cole | G06Q 20/326 |
| 2017/0214702 A1* | 7/2017 | Moscovici | H04W 12/106 |
| 2018/0027130 A1* | 1/2018 | Yermakov | H04M 15/61 |
| | | | 455/405 |
| 2018/0097597 A1* | 4/2018 | Legg | H04W 72/042 |
| 2018/0131593 A1* | 5/2018 | Jain | H04L 12/66 |
| 2018/0139585 A1* | 5/2018 | Gholmieh | H04L 65/65 |
| 2018/0270820 A1* | 9/2018 | Gupta | H04W 64/003 |
| 2018/0279202 A1* | 9/2018 | Tenny | H04W 40/246 |
| 2019/0045370 A1* | 2/2019 | Al-Fanek | H04W 16/14 |
| 2019/0053267 A1* | 2/2019 | Kim | H04W 72/1242 |
| 2019/0313205 A1* | 10/2019 | Ayoub | H04W 4/029 |
| 2020/0107249 A1* | 4/2020 | Stauffer | G01S 7/0234 |
| 2020/0137774 A1* | 4/2020 | Molisch | H04L 25/0228 |
| 2020/0228367 A1* | 7/2020 | Gamroth | H04L 12/2816 |
| 2020/0228621 A1* | 7/2020 | Gamroth | H04W 4/33 |
| 2020/0229206 A1* | 7/2020 | Badic | H04W 40/22 |
| 2021/0120529 A1* | 4/2021 | Park | H04L 5/0094 |
| 2021/0337508 A1* | 10/2021 | Gunnarsson | H04W 72/005 |
| 2021/0351837 A1* | 11/2021 | Nader | H04B 7/0693 |
| 2021/0400527 A1* | 12/2021 | Notargiacomo | H04W 28/0289 |
| 2022/0007403 A1* | 1/2022 | Li | H04W 72/1289 |
| 2022/0045554 A1* | 2/2022 | Leabman | H02J 50/40 |
| 2022/0201718 A1* | 6/2022 | Zhou | H04W 72/1284 |
| 2022/0210819 A1* | 6/2022 | Sevindik | H04W 72/1257 |

* cited by examiner

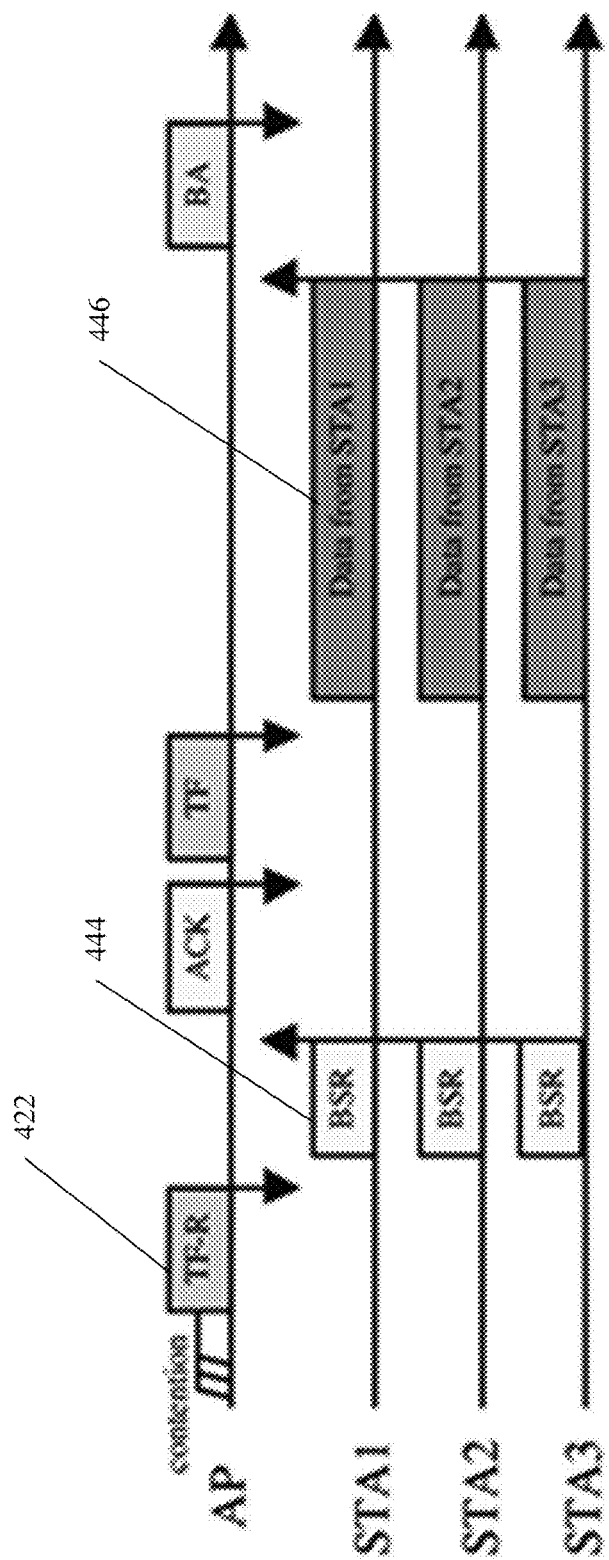
FIG. 4 (Reference)

EFFICIENT REAL-TIME 802.11AX OFDMA STATISTICS LOGGING

RELATED APPLICATIONS

This application claims priority to U.S. application Ser. No. 63/026,692, titled "Efficient Real-Time 802.ax OFDMA Statistics Logging", filed 18 May 2020. The priority applications is hereby incorporated by reference for all purposes

FIELD OF THE TECHNOLOGY DISCLOSED

The technology disclosed relates generally to efficient real time statistics logging for Wi-Fi networks described in IEEE 802.11ax which defines modifications for high efficiency operation in frequency bands between 2.4 GHz and 7.125 GHz, to both the IEEE 802.11 physical layer (PHY) and the medium access control (MAC) sublayer. More specifically, the technology discloses testing the performance of resource unit scheduling algorithms used by an orthogonal frequency division multiplexing access (OFDMA) enabled access point (AP) to support multiple wireless clients.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Wi-fi providers are adopting orthogonal frequency division multiplexing access (OFDMA). This new OFDMA standard, IEEE 802.11ax, combines frequency and time division multiplexing and, optionally spatial division. OFDMA is different from 802.11ac Wi-Fi, because time slots for transmit opportunities are allocated by the access point (AP). Clients avoid transmission collisions by using allocated transmission opportunities.

Access point providers are not given any standard, accompanying OFDMA, for how to allocate or schedule carriers and transmit opportunities. As AP providers develop allocation and scheduling strategies, testing will determine what works best.

OFDMA segregates the spectrum in time-frequency resource units (RUs). A central coordinating entity, the AP, assigns RUs for reception or transmission to associated stations. Through the central scheduling of the RUs contention overhead can be avoided, which increases efficiency in scenarios of dense deployments.

IEEE 802.11ax defines IEEE 802.11 physical layer (PHY) and the medium access control (MAC) sublayer modifications for high efficiency operation in frequency bands between 2.4 GHz and 7.125 GHz, and the use of 234 data-carrying sub-carriers in a 20 MHz RF channel. IEEE 802.11ax offers the key improvement of OFDMA, which modifies a Wi-Fi characteristic, taking the orthogonal frequency division multiplexing (OFDM) sub-carriers across the RF channel and assigning groups to transmissions between different devices. In downlink OFDMA, the AP can use different sub-carrier groups to send packets to different clients. In one example, the AP has data to send to three clients, and with OFDMA, it combines transmissions, sending frames to all three clients simultaneously. OFDMA enables higher efficiency and performance wireless networking by enabling concurrent uplink (UL) and downlink (DL) traffic across multiple clients.

Commercially available 802.11ax modules in use currently do not provide OFDMA statistics or logging which is critical for a number of access point (AP) test methodologies. A technique in current use for acquiring statistics applies a dedicated radio to each radio providing OFDMA client emulation, which results in only half the radios in the platform being available to operate as clients. For example, the existing octoScope test approach requires many radio frequency (RF) receivers to monitor simulated clients, one listening receiver sniffing for each simulated client.

An opportunity arises for reducing the number of radios needed to conduct tests of the performance of resource unit scheduling algorithms used by an OFDMA enabled AP to support multiple clients.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 4 shows a reference graph of trigger frames usable by a sniffer radio for monitoring common trigger frame data elements and extracting key RU statistics.

FIG. 5A and FIG. 5B illustrate OFDMA statistics reporting, with a disclosed downlink report of RU density over time, in real time views, for multiple ports 1-17. FIG. 5A shows a snippet of the downlink OFDMA counters report, with values covering the duration of the test.

FIG. 5B illustrates reporting of the downlink OFDMA results for the ports.

FIG. 5C and FIG. 5D illustrate disclosed OFDMA statistics reporting that displays uplink OFDMA results from the client to the AP, over time for six ports.

FIG. 5C shows instantaneous RU placement state results.

FIG. 5D illustrates uplink OFDMA results for ports by name.

FIG. 7 illustrates a report displaying counts of frames receiving and transmitting Physical Protocol Data Unit (PPDU) data.

DETAILED DESCRIPTION

Figure 1:
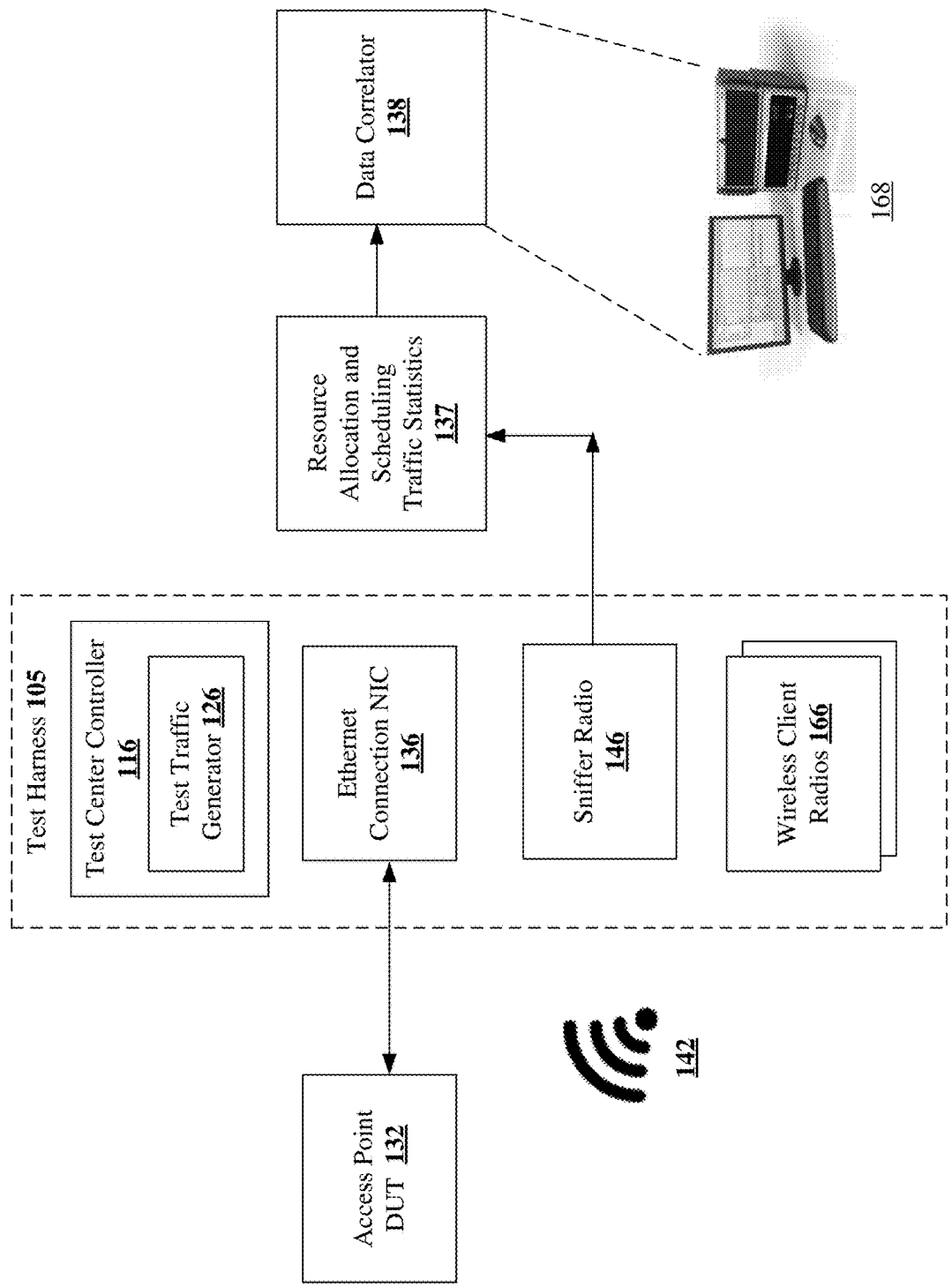
FIG. 1 depicts an exemplary system for testing the performance of resource unit scheduling algorithms used by an OFDMA enabled AP to support multiple clients, according to one implementation of the technology disclosed.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Performance tests of Wi-Fi systems collect observed behavior information from emulated radios. Test designs that pair an emulated client radio with a sniffer radio for each client radio, have high overhead and complexity.

In a test, a two-armed test harness connects over the wire to the access point on one arm and drives multiple clients via Wi-Fi on the other arm. Each client has its own radio. The AP allocates resource units (RUs) and schedules transmit opportunities for each client. For instance, an AP can allocate 26, 52, 106, 242, 484 or 996 tones, respectively. Channels have various bandwidths, such as 20, 40 or 80 MHz, which accommodate 256, 512 and 1024 tones, respectively. The number of clients supported on a channel depends on the number of tones allocated to each client. Performance of each client radio that is operating in transceiver mode is monitored by a counterpart radio that is operating in sniffer mode. In this manner, both the transceiver and sniffer radios can be implemented using standard system on a chip (SoC) devices, such as Intel's AX200 and AX210. A custom board is laid out with a plurality of these SoCs. The more SoCs per board and boards per server, the more clients a server can emulate in a test.

The use of SoC devices drives the transceiver-sniffer pairs approach, as the standard SoCs are not designed for test purposes. Each sniffer can see all of the traffic on its counterpart's transceiver carriers and in the allocated transmit opportunity time slots by mirroring the transceiver's setup. It can record detailed traffic statistics by sniffing. This generates excellent statistics, using sniffers paired to client transceivers, but requires many radios.

Applying a dedicated radio to each radio providing OFDMA client emulation results in only half the radios in the platform being available to operate as clients, though, so is inefficient, complex and expensive since it requires 37 Radios to test 80 MHz deployments and 74 Radios to test 160 MHz deployments.

The technology disclosed collects less information with many fewer receivers, but still enough information to reflect the performance of AP scheduling. One sniffer radio can monitor 37 transceiver clients or as many as the OFDMA standard permits to operate in a transmit opportunity timeslot. One sniffer cannot evaluate all the packet traffic or tune into all the carriers used by 37 transceiver clients. But one sniffer can monitor the carriers used to broadcast control messages that allocate RUs and transmit opportunities to clients.

In a test, one or both arms of the test harness originate and receive responses to test traffic. This traffic can be measured on an Ethernet or other wired connection to the AP and/or by counters on individual wireless clients, so throughput and retries can be evaluated without sniffing the over the air (OTA) traffic. The technology disclosed combines control message sniffing and non-sniffed evaluation of test traffic through the AP correlated with the AP's scheduling of RUs used by clients. The technology disclosed further includes orchestrating test scenarios of traffic between the clients and AP to stress the AP.

The technology disclosed dedicates a single Wi-Fi radio operating in sniffer mode to provide critical orthogonal frequency division multiple access (OFDMA) resource unit (RU) real-time statistics via monitoring and processing the access point (AP) trigger signals across multiple, concurrent clients in real-time on a per Wi-Fi frame basis, for obtaining real-time OFDMA statistics. Test designers can utilize testing results to further understand the AP scheduler effects across connected clients.

Next, we describe an example architecture for testing the performance of resource unit scheduling algorithms used by an OFDMA enabled AP to support multiple clients.

Architecture

FIG. 1 shows example architecture 100 for efficient real time statistics logging for Wi-Fi networks described in IEEE 802.11ax. Architecture 100 enables testing of the performance of resource unit (RU) scheduling algorithms used by an OFDMA enabled AP to support multiple clients. Architecture 100 includes test harness 105 for generating test traffic and recording traffic statistics during the tests, and access point (AP) 132. Test harness 105 is a two-armed test harness with one arm a wired connection to the AP and another arm a wireless (RF) connection 142 to the AP. Test harness 105 includes test center controller 116 with test traffic generator 126 and Ethernet connection network interface controller (NIC) 136. Test center controller 116 with test traffic generator 126 utilizes this two-armed configuration for testing AP scheduler designs, emulating both sides (arms) of the connection: wired connection and Wi-Fi connection. AP 132 is a networking hardware device that allows other Wi-Fi devices to connect to a wired network, and typically connects to a router (via a wired network) as a standalone device, and can also be an integral component of a router. Test harness 105 connects over the air (OTA) to the antennas of AP under test 132 for some test scenario implementations. AP 132 can be Internet of Things (IoT) access points, in some cases. Multiple wireless client radios 166 couple in radio frequency (RF) communication with AP 132, in some cases via Wi-Fi communication. Ethernet connection network interface controller (NIC) 136 is described further relative to FIG. 2.

Architecture 100 also includes sniffer radio 146, a wireless client configured in Wi-Fi sniffer mode, that monitors the transceiver clients, also referred to as wireless client radios 166, for OFDMA statistics. Sniffer radio 146 monitors the carriers used to broadcast control messages that allocate RUs to clients, and can monitor 37 transceiver clients or as many as the OFDMA standard permits to operate in a transmit opportunity timeslot. Sniffer radio 146 listens to trigger frames that contain information about resource allocation. Instead of listening to the clients directly, they listen to the AP directions to the clients. A different implementation of the disclosed technology, for efficiently monitoring clients that utilize a chip set with multiple different trigger packet types, can utilize two sniffer radios.

Architecture 100 also has resource allocation and scheduling traffic statistics 137, data correlator 138 and display device 168. Resource allocation and scheduling traffic statistics 137 get recorded by sniffer radio 146 for wireless client radios 166, on the wired side of the AP 132. Traffic can originate from both simulated servers and clients, depending on the test design. Statistics can be recorded on either arm of the test harness. In the disclosed technology, one sniffer radio 146 replaces multiple sniffers used in prior test systems. Monitoring of the scheduling traffic heard over the air by the sniffer radio is correlated with traffic statistics otherwise acquired. Data correlator 138 categorizes the recorded traffic statistics with the RU scheduling traffic heard by sniffer radio 146. Reports of statistics for AP 132 can be streamed to display device 168 in near real time, and logs and reports can be stored for future analysis of Wi-Fi networks and AP scheduling.

Both the test center controller 116 and the wireless client radios 166 can include hardware and software that implement features described herein. The test center controller 116 and the wireless client radios 166 may include one or more of logic arrays, memories, analog circuits, digital circuits, software, firmware and processors such as microprocessors, field programmable geared arrays (FPGAs), application-specific integrated circuits (ASICs), programmable logic devices (PLDs) and programmable logic arrays (PLAs). The hardware may be found in the chassis, card rack or integrated unit. It may include a specifically programmed and/or customized general purpose computer that is capable of communicating with access point 132. Both the test center controller 116 and the wireless client radios 166 may include a number of separate units that are clustered together or remote from one another.

Specifically, in an implementation, each of the test center controller 116 and the wireless client radios 166 can include a processor with at least four cores and could each include two processors, each having 16 cores. An implementation of the test center controller 116 and the wireless client radios 166 can also include 512 GB of random access memory (RAM) or more.

OFDMA tests of AP are useful for the tester to understand AP scheduler performance across connected clients. Traffic is generated by the wireless test clients, with predetermined responses on the wired side of the AP under test. The traffic received on and returned over the wired interface to the AP is recorded and correlated with the requests in the traffic generated by the wireless test clients. This traffic data is further correlated with RU allocations by the AP.

In one example of rate versus range testing, the test specifies setting different power levels and measuring distribution as allocation proceeds. Fewer resource units (RU) allocated to distant units is a subtle effect that indicates an effective AP scheduling strategy. On uplink, client can allocate its power, for example a watt, to a smaller set of subcarriers, which improves signal to noise ratio (SNR) at the receiver.

In addition to sniffing, tests collect through-put key performance indicators (KPI). In one example test, the tester can increase channel loss (decrease power) and run a throughput test. At −85 to −90 dba, the OFDMA is expected to perform better. Sniffing reveals problem, with collection of data by standard test center mechanisms, so straightforward to keep up with the traffic demands.

In an example of quality of service (QoS) testing, the AP provides the needed resources at the correct time, such as for real time video and voice needs, compared to email resource requirements. AP scheduler allocates to clients as needed. Layer two and layer three composite system throughput is tested with composite system simulations with a number of competing radios. Simulations show that interference builds up with old fashioned carrier sense multiple access (CSMA). For dynamic modulation coding scheme (MCS), the transmitter is aware of the transmit and receive signals, with packets based on packet info and knowing the coding scheme. MCS index values are usable to determine the likely data rate of the Wi-Fi connection, with the MCS value summarizing the number of spatial streams, the modulation type and the coding rate that is possible when connecting the wireless access point. The AP needs to be aware of channel conditions. It assigns the MCS on a packet basis, potentially up to MCS 13 (quadrature amplitude modulation—QAM 4096).

In an example with two extremes, consider one client and a thousand clients. When utilizing legacy Wi-Fi, everyone talks when they want, which is no problem with one client and there is no performance impairment. Alternatively, when 1000 clients are using legacy Wi-Fi, collisions occur. With 1000 clients, everyone is stepping on each other, so no information gets communicated and the clients get no composite throughput. Alternatively, OFDMA utilizes the channel condition info to schedule resource blocks. In the single user case, at 80 MHz, 996 tone RU can be scheduled. In one case the RU being allocated are on the order of a millisecond each. In composite, a set of tones makeup a channel. In the scenarios with many clients, as can be the case with connections to many Internet of things (IoT) devices which generate small amounts of data, such as a set of thermostat readings, a small number of RU is required, and the time slot for a single IoT device needs to be very short, since data must be padded to fill the RU, if only a very small of data needs to be transmitted.

Testing provides insights on AP throughput and can uncover root causes so that the AP developer can repair issues. In one implementation, traffic is generated by the wireless test clients, with predetermined responses on the wired side of the AP under test. The traffic received on and returned over the wired interface to the AP is recorded and correlated with the requests in the traffic generated by the wireless test clients. This traffic data is further correlated with RU allocations by the AP.

In another implementation, traffic is generated by the wireless test clients, with predetermined responses on the wired side of the AP under test. The traffic originated from and returned to the wireless clients is recorded and correlated with the requests generated by the simulated servers. This traffic data is further correlated with RU allocations by the AP.

The same scenarios can involve traffic generated by simulated servers coupled to the wireless clients. Traffic can be generated by the simulated servers, with predetermined responses by the simulated wireless test clients. The traffic received on and returned over the wired interface to the AP is recorded and correlated with the requests in the traffic generated by the wireless test clients. This traffic data is further correlated with RU allocations by the AP. Alternatively, traffic sent by and returned to the wireless clients can be recorded evaluated on the wireless clients and correlated with the requests generated by the simulated servers. This traffic data is further correlated with RU allocations by the AP.

Figure 2:
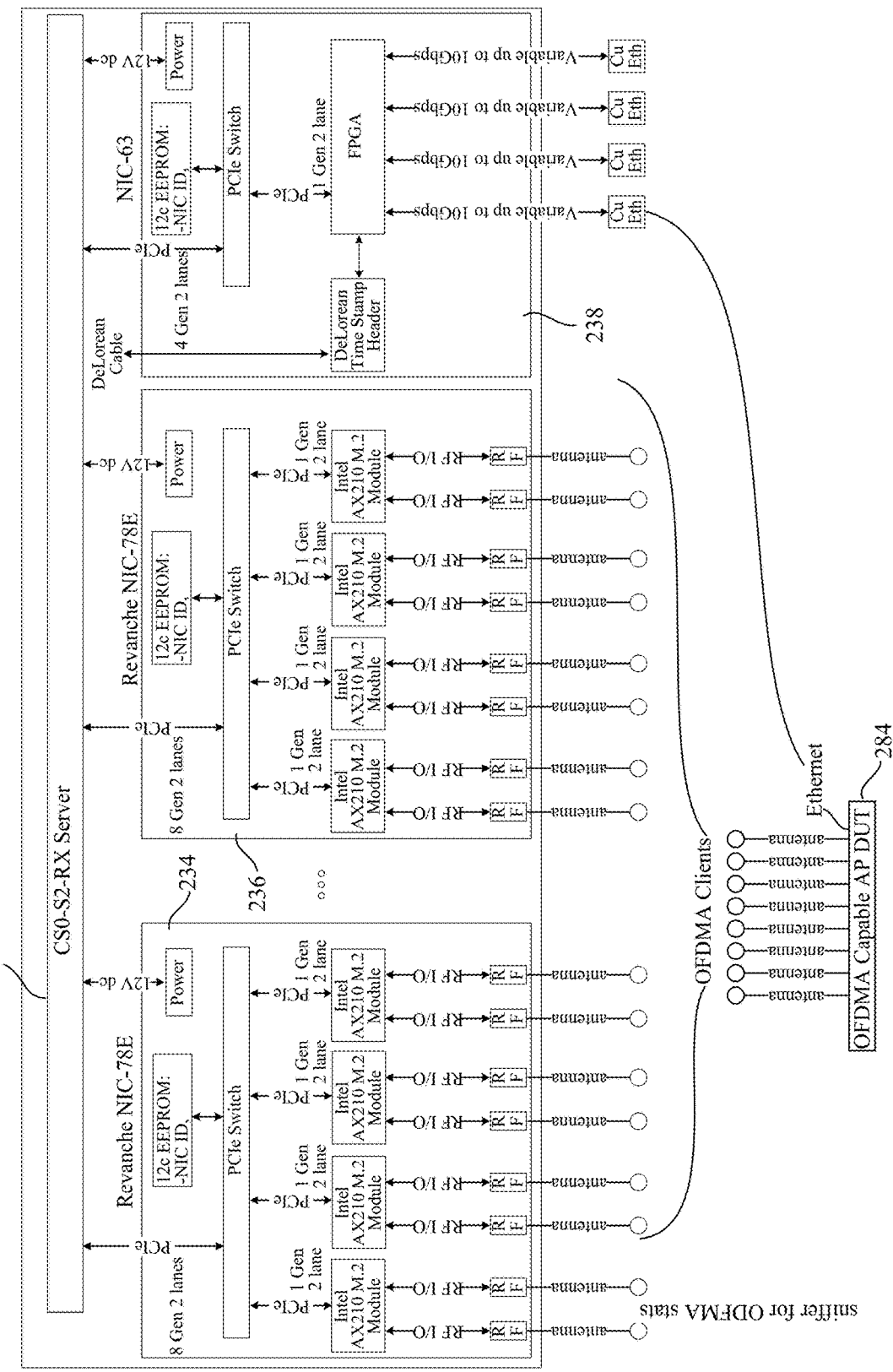
FIG. 2 illustrates hardware that can be used for testing the performance of resource unit scheduling algorithms used by an OFDMA enabled AP to support multiple clients.

FIG. 2 illustrates hardware that can be used to implement the technology disclosed. Multiple boards with network interface controllers 234, 236 with four radio modules each connect to server 224. Each of the system-on-a-chip (SoC) boards provides PHY and MAC sub layers and device drivers for testing a Wi-Fi network of radios. The example layout also illustrates OFDMA capable AP device under test (DUT) 284 with antennas for OTA transmissions, for testing in a shielded environment. Ethernet network interface controller (NIC) 238 provides an Ethernet wired connection for connecting to DUT 284. Multiple Ethernet ports can be included on a single NIC; in one example four 10 Gbit ports are supported by a single NIC board. The example Ethernet NIC 238 utilizes at least one custom FPGA chip and specialized hardware for accessing and monitoring DUT.

Figure 3:
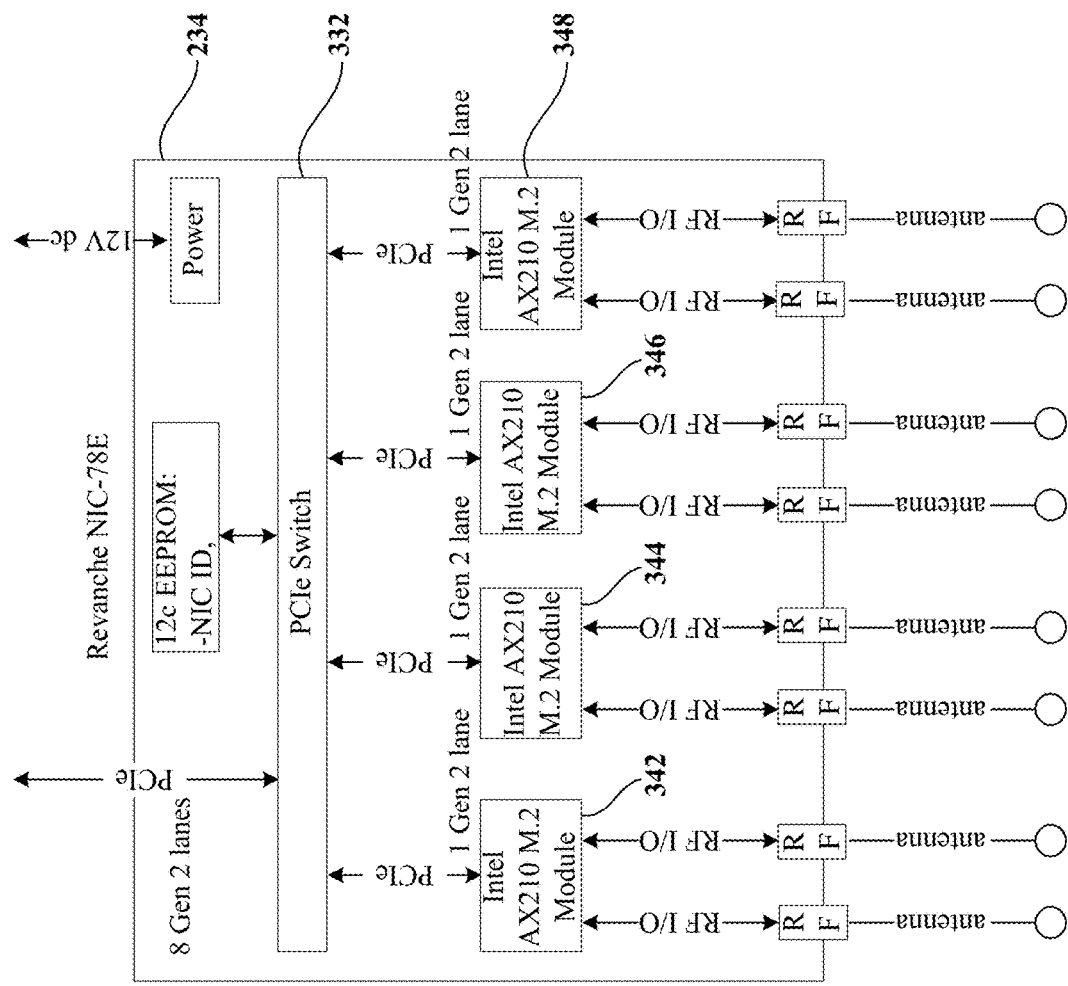
FIG. 3 illustrates a single disclosed network interface controller board with four radio modules for connecting between a server and a set of remote radios on a network.

FIG. 3 illustrates a block diagram of a single network interface controller (NIC). NIC-78E is a single network interface controller 234 with four radio modules for connecting between a server and a set of remote radios on a network, connecting radios to the processing system in this example. PCIe, a switch-based technology, is used to interconnect a large number of peripheral devices to a processor system. Network interface controller 234 is populated with system on a chip (SoC) devices that provide the PHY and MAC layer and device drivers. In this example, each NIC-78E utilizes four Intel AX210 SoC modules 342, 344,346, 348. In another implementation a different SoC can be utilized. Each of four Intel AX210 M/2 Modules on a NIC board delivers connectivity at Gbit wireless speeds through two antenna connections. In one disclosed implementation of five boards, nineteen of the twenty available radios can be allocated as virtual clients and one radio can be configured as a sniffer that monitors trigger frames such as multi-user buffer status report poll (MU-BSRP), MU-RTS trigger frame variant, multi-user (MU)-MBA data elements and extract key RU statistics. Example reports of trigger frame information are described relative to FIG. 5A, 5B, 5C and 5D below.

OFDMA enables higher efficiency and performance wireless networking by enabling concurrent uplink (UL) and downlink (DL) traffic across multiple clients.

The table listed next illustrates resource unit (RU) type to maximum concurrent client mapping, as specified in IEEE 802.11ax.

| RU Type | 20 MHz BW 256 tones | 40 MHz BW 512 tones | 80 MHz BW 1024 tones | 80 + 80 or 160 MHz BW 2048 tones |
|---|---|---|---|---|
| 26 tone RU | 9 | 18 | 37 | 74 |
| 52 tone RU | 4 | 8 | 16 | 32 |
| 106 tone RU | 2 | 4 | 8 | 16 |
| 242 tone RU | 1 | 2 | 4 | 8 |
| 484 tone RU | n/a | 1 | 2 | 4 |
| 996 tone RU | n/a | n/a | 1 | 2 |
| 2 × 996 tone RU | n/a | n/a | n/a | 1 |

OFDMA is coordinated by the AP scheduler and managed on a per-transmit opportunity (TxOp) basis. TxOp is the AP recognition of an OFDMA opportunity. AP can decipher uplink (UL) traffic requirements via Client Buffer Sounding, which considers how much data is in the data queue for a DUT. IEEE 802.11ax specifies the UL OFDMA procedure, as it relates to the AP MAC.

1. Trigger #1—BSRP (Buffer Status Report Poll) trigger frame variant sent to clients to learn how much data is in their buffers
2. Clients respond with their BSR (Buffer Status Reports) to tell AP how much data they have ready to send (typically 26 tone)
   a. BSR can also be sent ad hoc (unrequested) by clients
   b. Includes AID (Association Identification, a portion of the BSR sent by the clients to inform AP MAC Scheduler how much data they have to transmit)
   c. Includes QoS
3. AP builds a RU schedule (proprietary IP) which includes:
   a. Start time
   b. Stop time
   c. Client to RU mapping
   d. MCS transmit parameter
   e. Power Level per RU (total power managed by FCC but some RU can have higher power than others)
4. Trigger #2—MU-RTS (trigger frame variant) to get clients ready
5. Clients reply to CTS (Clear To Send)
6. Trigger #3—DL Trigger Frame assigns RU resources to each client If not all RU are allocated, AP can choose to make some RU Unassigned and Random Access (Clients then use carefully via the OFDMA back-off procedure)
7. Clients then Tx on UL on the assigned RUs (Clients with less data MUST Tx the full allocated time with padding)
8. AP then sends a Multi-STAtion Block Acknowledgement Indicates receipt of all PPDU It has been observed that chip set manufacturers for different access points may utilize different trigger messages.

FIG. 4 shows a reference graph of trigger frames 422 usable by sniffer radio 146 for monitoring common trigger frame data elements, including buffer status report frames 444 for MU-BSRP, MU-RTS, MU-MBA, and extracting key RU statistics. The monitored traffic statistic data elements 446 can be interpolated and correlated with the RU scheduling traffic heard by the sniffer radio. Sniffer radio 146 can stream resulting statistics for real time display. Multiple additional trigger messages, not shown in FIG. 4, can be utilized for some implementations of the disclosed system.

The downlink (DL) OFDMA procedure specified by IEEE 802.11ax procedure, as it relates to the AP MAC, is summarized next.

1. AP transmits the MU-RTS to the target clients
   a. MU-RTS is an extended trigger frame sent across the full center 20 MHz (for legacy clients)
   b. MU-RTS provides the clients with guidance on who is going to be targeted for the upcoming MU DL PPDU and on which RU they will find their data
2. Clients respond in the UL with the CTS response (concurrently in their assigned RUs)
3. AP transmits SIFS then the DL OFDMA MU PPDU (the data frame) Duration of data frame varies as indicated by the MU-RTS
4. AP transmits SIFS then a Block ACK Request then a SIFS
5. Clients respond in the UL with Block ACK Or client can be Auto Block ACK request mode (BAR not required)

The disclosed technology enables efficient statistics logging without allocating stacks of instruments for monitoring. Environmental and data packet specifics affect data rates, so it is valuable to the tester to be able to view instant state results and stream blocks. The layer two through layer seven data provide information and the tester decides what clients to monitor.

Figure 5A:
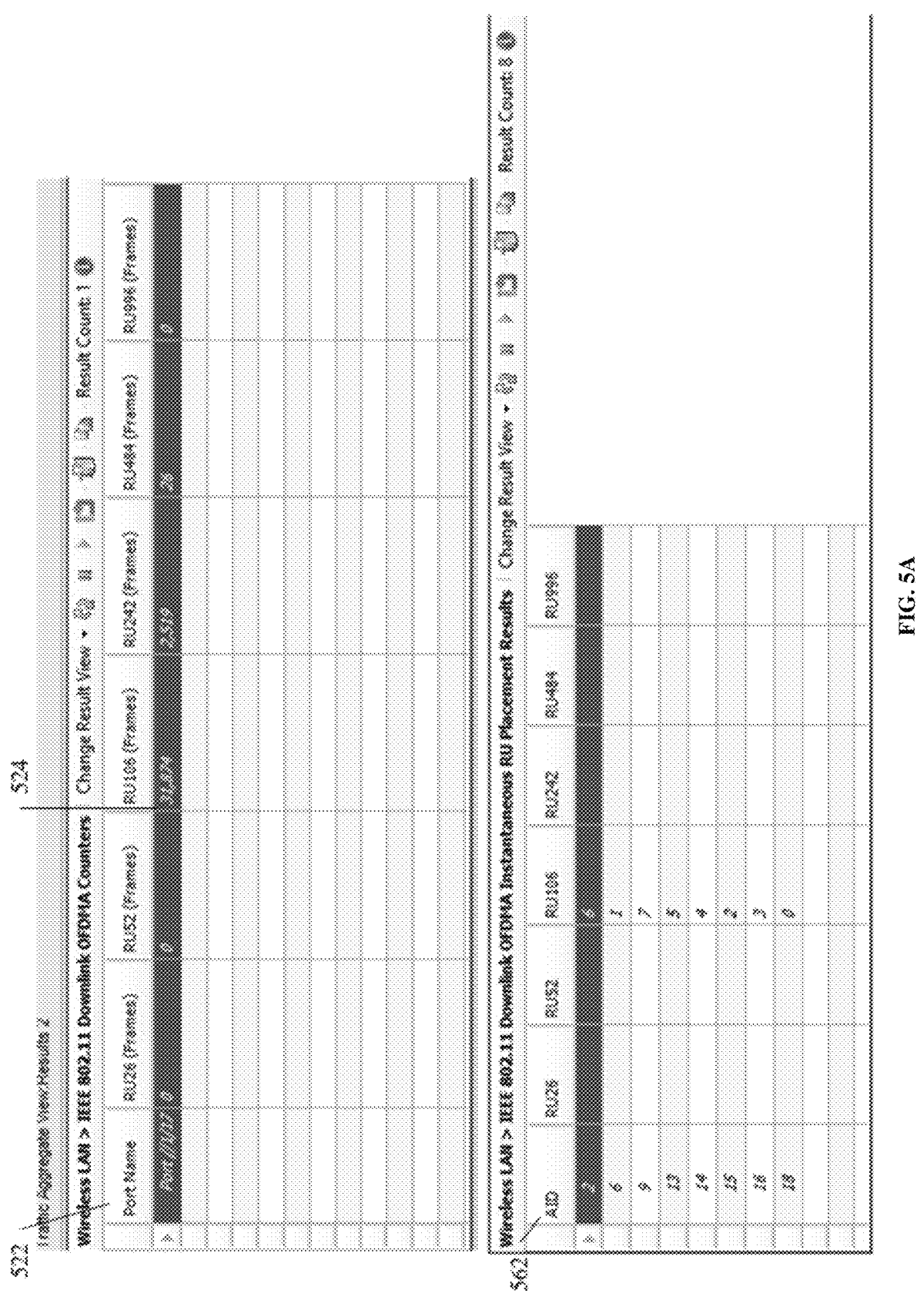
Figure 5B:
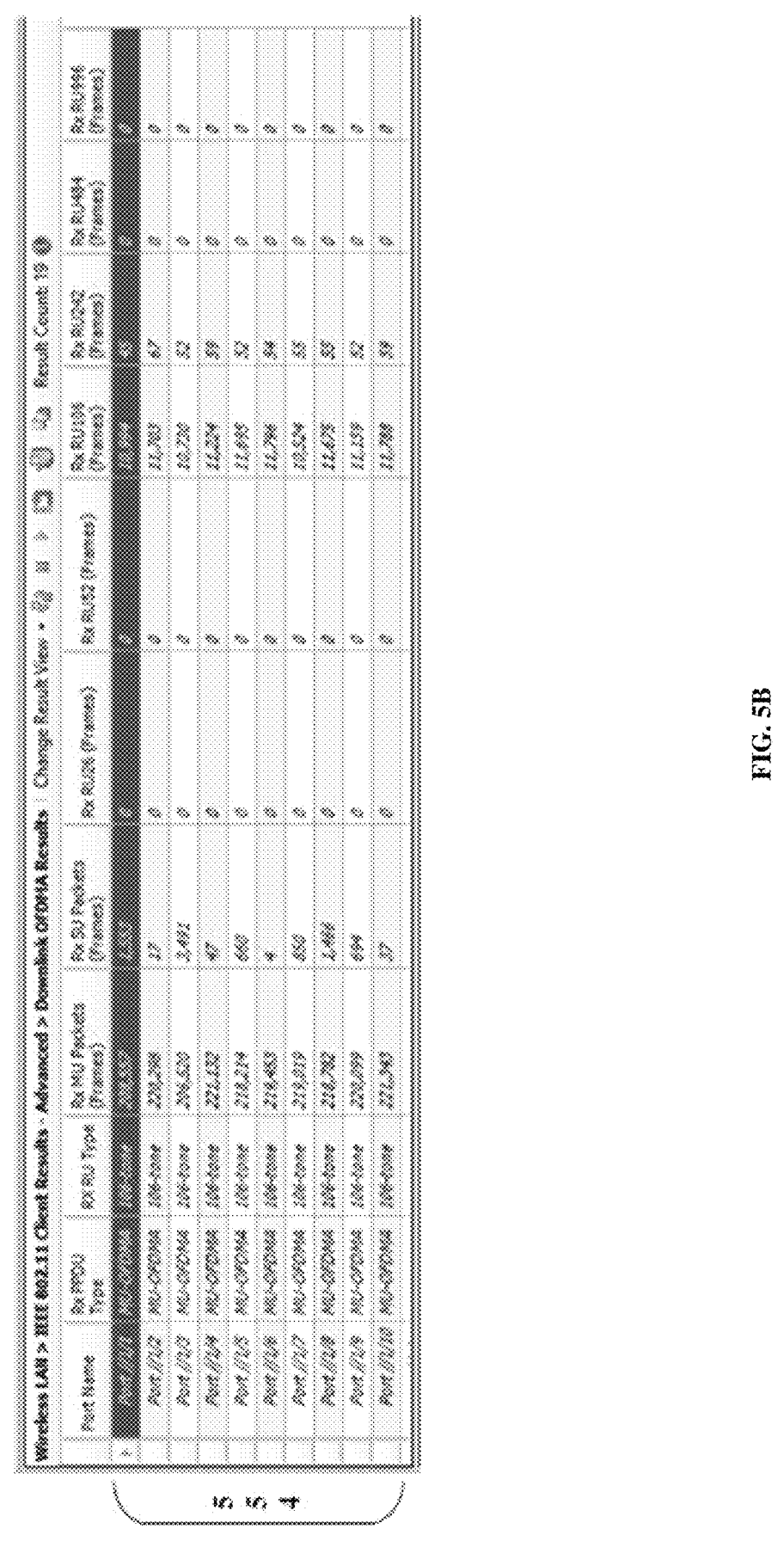

FIG. 5A and FIG. 5B illustrate OFDMA statistics reporting, with a disclosed downlink (DL) report of RU density over time, in real time views, for multiple ports 1-17 522. FIG. 5A shows a snippet of the downlink OFDMA counters report, with values covering the duration of the test. Most of the data is streamed utilizing Ru106 frames, as seen by the displayed count of Ru106 data packets 524. FIG. 5A also illustrates the download OFDMA instantaneous RU placement results for the various RU type counters, for a result count of 8 ports. AID 562, Association Identification, is a portion of the BSR sent by the clients to inform AP MAC Scheduler how much data they have to transmit. The instantaneous state results show that the packets are being transmitted via Ru106 frames. FIG. 5B illustrates reporting of the downlink OFDMA results for the ports 554.

Figure 5C:
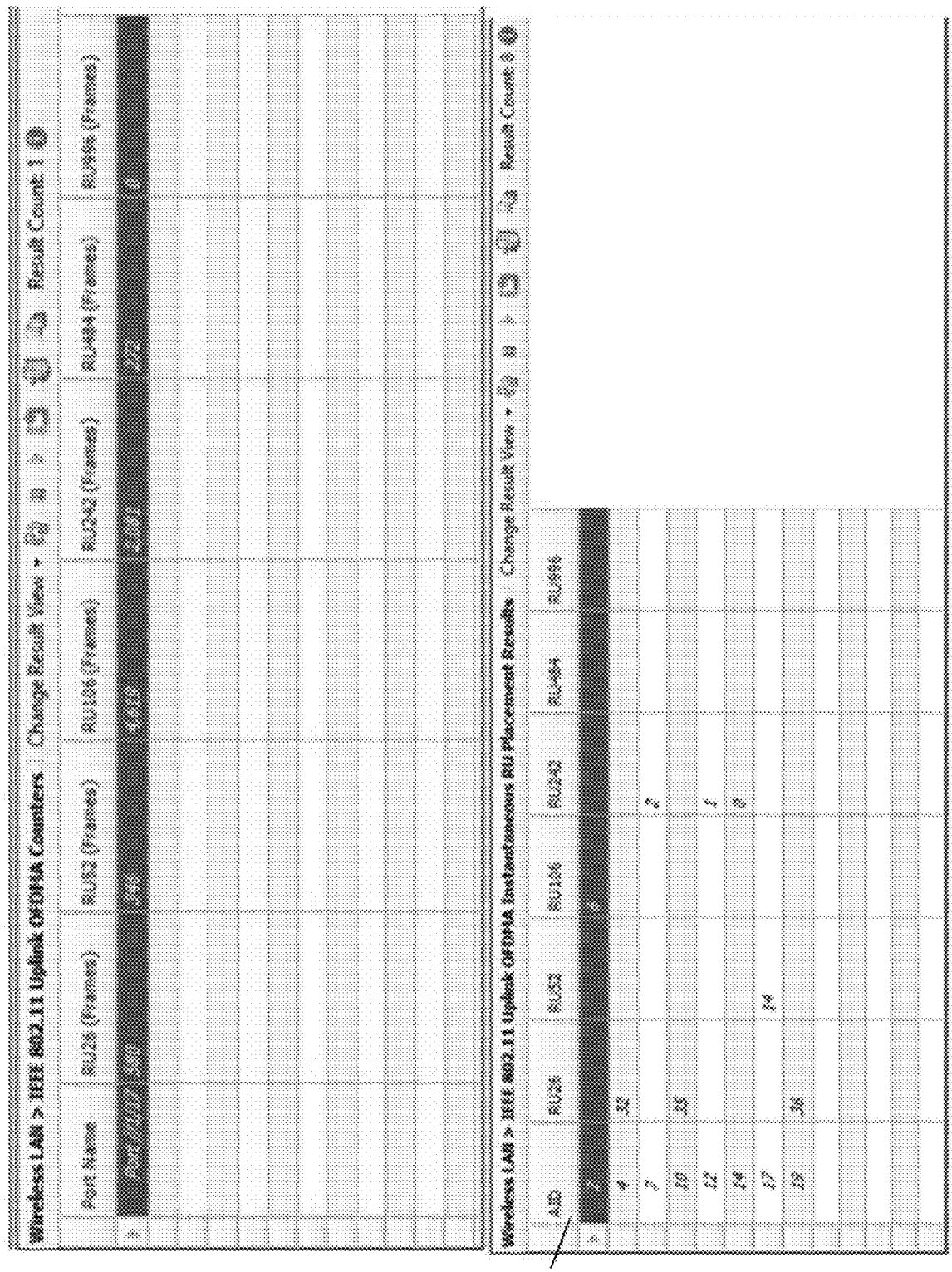
Figure 5D:
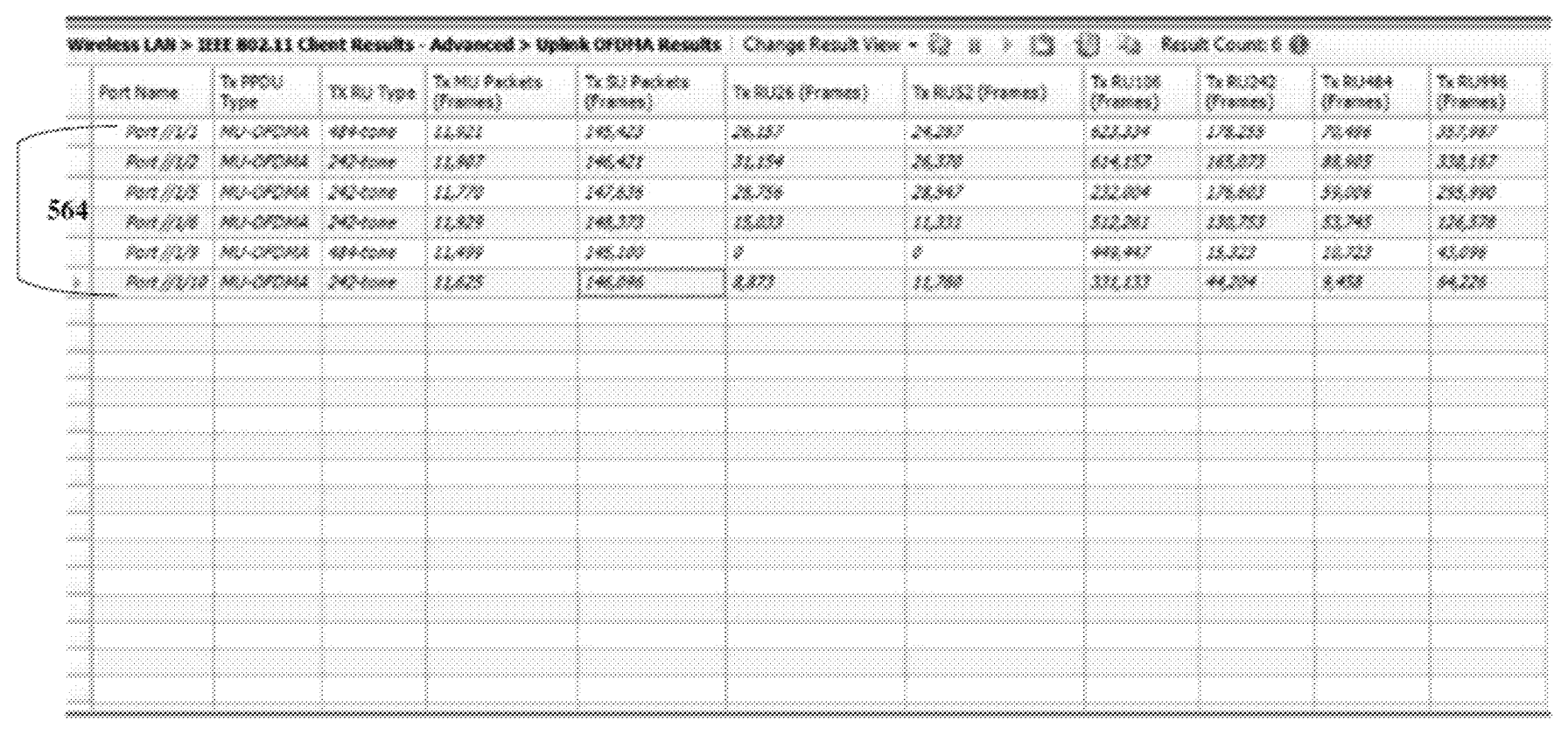

FIG. 5C and FIG. 5D illustrate disclosed OFDMA statistics reporting that displays uplink OFDMA results from the client to the AP, over time for six ports 564. In the instantaneous RU placement state results 552 shown in FIG. 5C, multiple clients are active with client RU26 reporting most of the uplink data. FIG. 5D illustrates uplink OFDMA results for ports by name 564. In this set of example data, the uplink report displays results across types.

Figure 7:
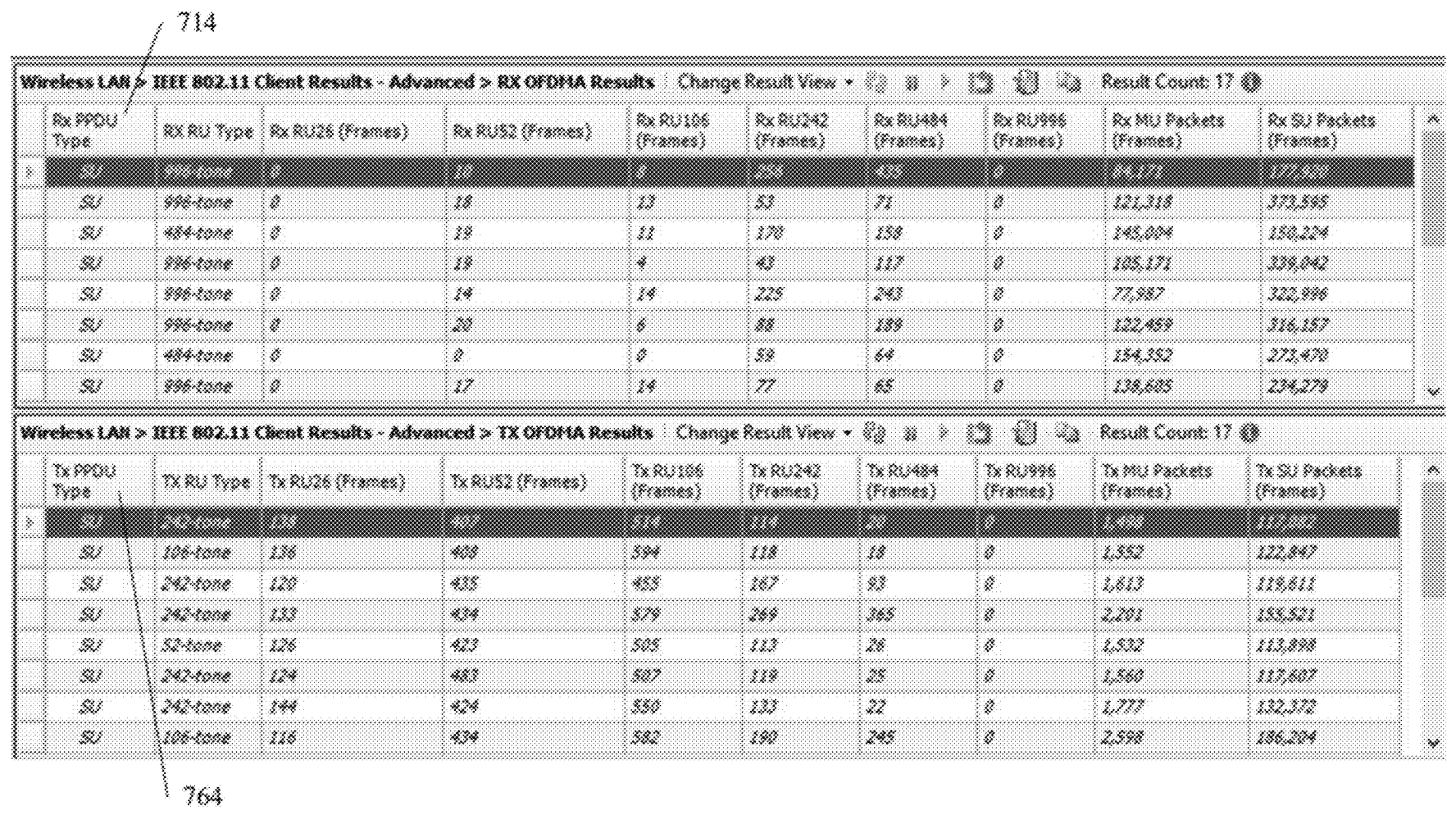

FIG. 7 illustrates a report displaying counts of frames receiving and transmitting Physical Protocol Data Unit (PPDU) data: receive OFDMA results 714 and transmit OFDMA results 764, using the disclosed technology.

Next, we describe a computer system usable for testing the performance of resource unit scheduling algorithms used by an OFDMA enabled AP to support multiple wireless clients.

Computer System

Figure 6:
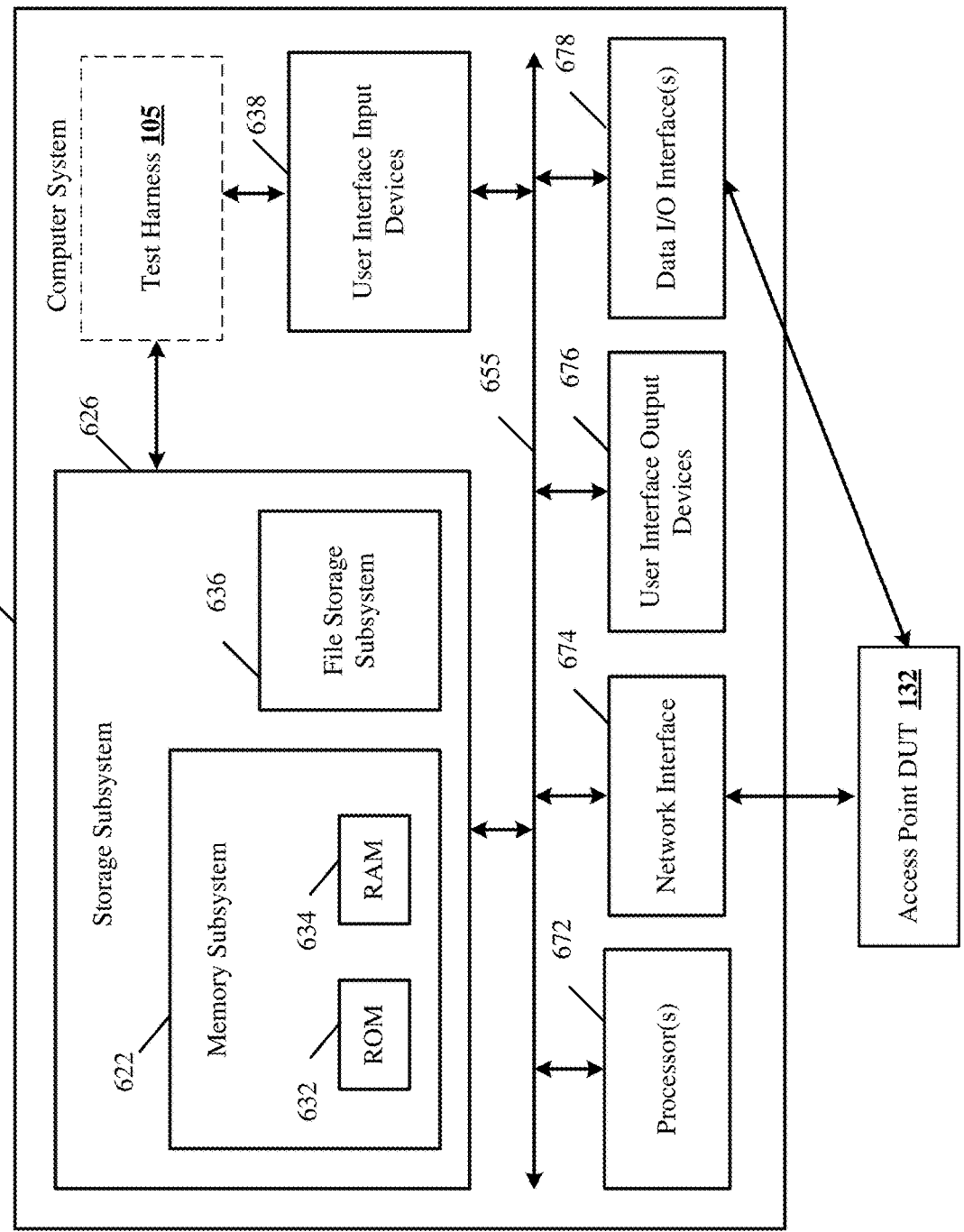
FIG. 6 depicts a block diagram of an exemplary system for testing the performance of resource unit scheduling algorithms used by an OFDMA enabled AP to support multiple clients, according to one implementation of the technology disclosed.

FIG. 6 is a simplified block diagram of a computer system 610 that can be used for testing the performance of resource unit scheduling algorithms used by an OFDMA enabled AP to support multiple clients.

Computer system 600 includes at least one central processing unit (CPU) 672 with navigation data generator 105 that communicates with a number of peripheral devices via bus subsystem 655. These peripheral devices can include a storage subsystem 626 including, for example, memory devices and a file storage subsystem 636, user interface input devices 638, user interface output devices 676, and a network interface subsystem 674. The input and output devices allow user interaction with computer system 600. Network interface subsystem 674 provides an interface to a communication network 684, and to corresponding interface devices in other computer systems.

In one implementation, the test harness 105 of FIG. 1 is communicably linked to the storage subsystem 626 and the user interface input devices 638 through network interface 674. User interface input devices 638 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 600.

User interface output devices 676 can include a display subsystem, a printer, a fax machine, or non-visual displays such as audio output devices. The display subsystem can include an LED display, a flat-panel device such as a liquid crystal display (LCD), a projection device, a cathode ray tube (CRT), or some other mechanism for creating a visible image. The display subsystem can also provide a non-visual display such as audio output devices. In general, use of the term "output device" is intended to include all possible types of devices and ways to output information from computer system 600 to the user or to another machine or computer system.

Storage subsystem 626 stores programming and data constructs that provide the functionality of some or all of the modules and methods described herein.

Memory subsystem 622 used in the storage subsystem 610 can include a number of memories including a main random access memory (RAM) 632 for storage of instructions and data during program execution and a read only memory (ROM) 634 in which fixed instructions are stored. A file storage subsystem 636 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 636 in the memory subsystem 622, or in other machines accessible by the processor.

Bus subsystem 655 provides a mechanism for letting the various components and subsystems of computer system 600 communicate with each other as intended. Although bus subsystem 655 is shown schematically as a single bus, alternative implementations of the bus subsystem can use multiple busses.

Computer system 600 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 600 depicted in FIG. 6 is intended only as a specific example for purposes of illustrating the preferred embodiments of the present invention. Many other configurations of computer system 600 are possible having more or less components than the computer system depicted in FIG. 6.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein. The scope of the technology disclosed is defined by the appended claims.

Some Particular Implementations

Some particular implementations and features are described in the following discussion.

In one implementation, a disclosed system for testing performance of resource unit scheduling algorithms used by an orthogonal frequency division multiplexing access (OFDMA) enabled access point (AP) to support multiple wireless clients, includes a two-armed test harness with a wired connection to one side of an AP under test and multiple wireless clients coupled in radio frequency (RF) communication with the AP. The system also includes the wireless clients coupled by RF to antenna(s) of the AP under test, and the test harness including a test traffic generator. The disclosed system further includes a sniffer radio that listens to resource unit (RU) allocation and scheduling traffic broadcast by the AP to multiple clients, and the recorded resource allocation statistics categorized with the RU scheduling traffic heard by the sniffer radio. The disclosed system also includes a recording module that records the RU allocation and scheduling traffic broadcast by the AP to multiple clients, and a report generator that categorizes the recorded RU allocation with the RU scheduling traffic heard by the sniffer radio and provides resource allocation statistics.

This system and other implementations of the technology disclosed can include one or more of the following features and/or features described in connection with additional aspects disclosed. In the interest of conciseness, the combinations of features disclosed in this application are not individually enumerated and are not repeated with each base set of features.

Some implementations of the disclosed system further include the wireless clients connected conductively to antenna(s) of the AP under test and further include resource allocation statistics recorded by the wireless clients connected conductively to antenna(s) of the AP under test.

Other implementations of the disclosed system further include the wireless clients connected over-the-air (OTA) to antenna(s) of the AP under test and further include traffic statistics recorded by the wireless clients connected OTA to antenna(s) of the AP under test.

Disclosed systems further include a report displaying data that reflects the recorded resource allocation statistics categorized with the RU scheduling traffic heard by the sniffer radio, in many implementations.

Some implementations of the disclosed system also further include traffic statistics recorded by the wireless clients, on the wired side of the AP.

In another implementation, a disclosed system includes one or more processors coupled to memory, the memory loaded with computer instructions, when executed on the processors, implement any of the disclosed methods.

In yet another implementation a disclosed tangible non-transitory computer readable storage media is impressed with computer program instructions that, when executed on a processor, implement any of the disclosed methods.

The technology disclosed can be practiced as a system, method, or article of manufacture. One or more features of an implementation can be combined with the base implementation. Implementations that are not mutually exclusive are taught to be combinable. One or more features of an implementation can be combined with other implementations.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

We claim as follows:

1. A system for testing performance of resource unit scheduling algorithms used by an orthogonal frequency division multiplexing access (abbreviated OFDMA) enabled access point (abbreviated AP) to support multiple wireless clients, including:
    a two-armed test harness with a wired connection to one side of an AP under test and multiple wireless clients coupled in radio frequency (abbreviated RF) communication with the AP;
    the wireless clients coupled by RF to antenna(s) of the AP under test;
    the test harness including a test traffic generator;
    a sniffer radio that listens to resource unit (abbreviated RU) allocation and scheduling traffic broadcast by the AP to multiple clients;
    a recording module that records the RU allocation and the scheduling traffic; and
    a report generator that categorizes the recorded resource RU allocation with the RU scheduling traffic heard by the sniffer radio and provides resource allocation statistics.

2. The system of claim 1, further including the wireless clients connected conductively to antenna(s) of the AP under test.

3. The system of claim 2, further including resource allocation statistics recorded by the wireless clients connected conductively to antenna(s) of the AP under test.

4. The system of claim 1, further including the wireless clients connected over-the-air (abbreviated OTA) to antenna(s) of the AP under test.

5. The system of claim 4, further including traffic statistics recorded by the wireless clients connected OTA to antenna(s) of the AP under test.

6. The system of claim 1, further including a report displaying data that reflects the recorded resource allocation statistics categorized with the RU scheduling traffic heard by the sniffer radio.

7. The system of claim 1, further including traffic statistics recorded by the wireless clients, on the wired side of the AP.

8. A method for testing performance of resource unit scheduling algorithms used by an access point (abbreviated AP) configured for orthogonal frequency division multiplexing access (abbreviated OFDMA) support of multiple wireless clients, the AP coupled by a wired connection to a first side of a two-armed test harness and wirelessly to multiple wireless clients on a second side of the test harness, the test harness further including a sniffer radio that receives traffic broadcast by the AP to the multiple wireless clients, the method including:
    the test harness generating test traffic and sending the test traffic to the AP;
    receiving resource unit (abbreviated RU) allocation and scheduling traffic broadcast by the AP to the multiple wireless clients;
    recording the RU allocation and the scheduling traffic; and
    reporting by category the recorded resource RU allocation with the RU scheduling traffic and further reporting resource allocation statistics.

9. The method of claim 8, further including the wireless clients connected conductively to antenna(s) of the AP under test.

10. The method of claim 9, further including resource allocation statistics recorded by the wireless clients connected conductively to antenna(s) of the AP under test.

11. The method of claim 8, further including the wireless clients connected over-the-air (abbreviated OTA) to antenna(s) of the AP under test.

12. The method of claim 11, further including traffic statistics recorded by the wireless clients connected OTA to antenna(s) of the AP under test.

13. The method of claim 8, further including a report displaying data that reflects the recorded resource allocation statistics categorized with the RU scheduling traffic heard by the sniffer radio.

14. The method of claim 8, further including traffic statistics recorded by the wireless clients, on the wired side of the AP.

15. A tangible non-transitory computer readable storage media impressed with computer program instructions that, when executed, test performance of resource unit scheduling algorithms used by an access point (abbreviated AP) configured for orthogonal frequency division multiplexing access (abbreviated OFDMA) support of multiple wireless clients, the AP coupled by a wired connection to a first side of a two-armed test harness and wirelessly to multiple wireless clients on a second side of the test harness, the test harness further including a sniffer radio that receives traffic broadcast by the AP to the multiple wireless clients, including:
    the test harness generating test traffic and sending the test traffic to the AP;
    receiving resource unit (abbreviated RU) allocation and scheduling traffic broadcast by the AP to the multiple wireless clients;
    recording the RU allocation and the scheduling traffic; and
    reporting by category the recorded resource RU allocation with the RU scheduling traffic and further reporting resource allocation statistics.

16. The tangible non-transitory computer readable storage media of claim 15, further including the wireless clients connected conductively to antenna(s) of the AP under test.

17. The tangible non-transitory computer readable storage media of claim 16, further including resource allocation statistics recorded by the wireless clients connected conductively to antenna(s) of the AP under test.

18. The tangible non-transitory computer readable storage media of claim 15, further including the wireless clients connected over-the-air (abbreviated OTA) to antenna(s) of the AP under test.

19. The tangible non-transitory computer readable storage media of claim 18, further including traffic statistics recorded by the wireless clients connected OTA to antenna(s) of the AP under test.

20. The tangible non-transitory computer readable storage media of claim 15, further including a report displaying data that reflects the recorded resource allocation statistics categorized with the RU scheduling traffic heard by the sniffer radio.

\* \* \* \* \*